United States Patent
Meyer et al.

(10) Patent No.: US 9,636,612 B2
(45) Date of Patent: May 2, 2017

(54) FILTER HOUSING FOR EXCHANGEABLE FILTER

(71) Applicant: Sartorius Stedim Biotech GmbH, Goettingen (DE)

(72) Inventors: Theo Meyer, Holzerode (DE); Christian Weber, Hessisch Lichtenau (DE)

(73) Assignee: Sartorius Stedim Biotech GmbH (DE)

( * ) Notice: Subject to any disclaimer, the term of this patent is extended or adjusted under 35 U.S.C. 154(b) by 0 days.

(21) Appl. No.: 14/389,440

(22) PCT Filed: Mar. 7, 2013

(86) PCT No.: PCT/EP2013/000683
§ 371 (c)(1),
(2) Date: Sep. 30, 2014

(87) PCT Pub. No.: WO2013/143651
PCT Pub. Date: Oct. 3, 2013

(65) Prior Publication Data
US 2015/0060343 A1   Mar. 5, 2015

(30) Foreign Application Priority Data

Mar. 30, 2012 (DE) .................. 20 2012 003 252

(51) Int. Cl.
*B01D 35/30* (2006.01)
(52) U.S. Cl.
CPC ........ *B01D 35/30* (2013.01); *B01D 2201/304* (2013.01)
(58) Field of Classification Search
None
See application file for complete search history.

(56) References Cited

U.S. PATENT DOCUMENTS

| 4,120,794 A | 10/1978 | Taylor |
| 4,525,725 A | 6/1985 | Kinoshita et al. |

(Continued)

FOREIGN PATENT DOCUMENTS

| AT | 26543 | 7/1987 |
| DE | 3617420 | 11/1987 |
| JP | 8-276107 | 10/1996 |

OTHER PUBLICATIONS

English Translation of International Preliminary report on patentability (Chapter 1) for PCT/EP2013/000683.

*Primary Examiner* — Thomas M Lithgow
(74) *Attorney, Agent, or Firm* — Gerald E. Hespos; Michael J. Porco; Matthew T. Hespos

(57) ABSTRACT

The invention relates to a filter housing for exchangeable filters, having a housing base for accommodating the filter and having a housing dome which engages over the filter, wherein the housing base and the housing dome are connected to one another by means of an aseptic clamping connection which has a groove-type clamping fitting on the housing base and has a flange-type clamping fitting on the housing dome, these being fixed against one another in their connected position by means of a clamp, wherein the groove-type clamping fitting has a seal groove with a seal by means of which the groove-type clamping fitting can be sealed off with respect to the flange-type clamping fitting, wherein the housing base has a port for the supply of liquid to be filtered and has a port for the discharge of filtered liquid, and wherein the housing base has, transversely with respect to the housing longitudinal axis, a base surface which is adjacent to the face surface of the inserted filter.

11 Claims, 5 Drawing Sheets

(56) References Cited

U.S. PATENT DOCUMENTS

| | | |
|---|---|---|
| 6,372,133 B1 | 4/2002 | von der Hardt et al. |
| 2002/0121469 A1* | 9/2002 | Garber .................. B01D 35/30 |
| | | 210/232 |
| 2004/0216434 A1 | 11/2004 | Gunderson et al. |
| 2009/0184063 A1 | 7/2009 | Brennan et al. |
| 2009/0301962 A1* | 12/2009 | Priebe .................... B01D 29/21 |
| | | 210/450 |

* cited by examiner

FILTER HOUSING FOR EXCHANGEABLE FILTER

BACKGROUND

1. Field of the Invention

The invention relates to a filter housing for exchangeable filters, having a housing base for accommodating the filter and having a housing dome that engages over the filter. The housing base and the housing dome can be connected to one another by an aseptic clamping connection that has a groove-type clamping fitting on the housing base and a flange-type clamping fitting on the housing dome, these being fixed against one another in their connected position by a clamp. The groove-type clamping fitting has a seal groove with a seal by means of which the groove-type clamping fitting can be sealed off with respect to the flange-type clamping fitting. The housing base has a port for the supply of liquid to be filtered and a port for the discharge of filtered liquid. The housing base has a base surface adjacent to the face surface of the inserted filter and transverse to the longitudinal axis of the housing.

2. Description of the Related Art

A filter housing for the filtration of liquids in the biopharmaceutical industry is known from the corporate brochure "Products and Solutions for the Biopharmaceutical Industry" from Sartorius Stedim Biotech GmbH.

Filter housings for exchangeable filters are composed of a housing base for accommodating the filter and a housing dome that engages over the filter. The housing base and the housing dome are connected to one another by an aseptic clamping connection. The housing base has a groove-type clamping fitting that is connected by a clamp to a flange-type clamping fitting of the housing dome. The groove-type clamping fitting has a seal groove with an O-ring seal for sealing off the groove-type clamping fitting with respect to the flange-type clamping fitting. The housing base has a port for the supply of liquid to be filtered and has a port for the discharge of filtered liquid. The housing base has a base surface that is adjacent to the face surface of the inserted filter and transverse to the longitudinal axis. The base surface has a central opening leading to the outflow duct that issues into the port for the discharge of the filtered liquid.

A disadvantage of the known filter housing, which with regard to its aseptic clamping connection conforms to DIN 11864-3 and DIN 11853-3 and which has basically proven successful, is that, during evacuation of the filter housing, liquid can be left behind on the base surface in the direction of the face surface of the filter.

The problem addressed by the present invention is therefore that of improving the known filter housing such that as far as possible no liquid residues are left behind both during filtering and also during cleaning or rinsing processes.

SUMMARY OF THE INVENTION

The invention relates to a filter housing for exchangeable filters. The filter housing has a housing base for accommodating the filter and a housing dome that engages over the filter. The housing base and the housing dome can be connected to one another by an aseptic clamping connection that has a groove-type clamping fitting on the housing base and a flange-type clamping fitting on the housing dome. The groove-type clamping fitting and the flange-type clamping fitting can be fixed against one another in their connected position by a clamp. The groove-type clamping fitting has a seal groove with a seal by means of which the groove-type clamping fitting can be sealed off with respect to the flange-type clamping fitting. The housing base has a port for the supply of liquid to be filtered and has a port for the discharge of filtered liquid. The housing base has a base surface that is adjacent to the face surface of the inserted filter. The base surface is inclined inward toward the housing longitudinal axis with respect to a horizontal plane arranged transverse to the housing longitudinal axis.

The inclination of the base surface toward the housing longitudinal axis or toward its central opening makes it possible for even last residues of liquid to flow off from the base surface of their own accord.

The base surface is of annular form with a central opening leading to a liquid outflow.

The seal groove may be delimited in the direction of the housing longitudinal axis by an inner collar with an encircling inner surface that forms the outer delimitation for the base surface. The inner surface runs parallel to the housing longitudinal axis, that is to say runs substantially vertically and contributes to a reliable outflow of liquid. It is basically possible for the base surface to be elevated to the seal groove or to the delimitation thereof or for the base surface to be set lower and to be inclined or sloped downward toward the housing longitudinal axis.

The base surface may be inclined toward the housing longitudinal axis by an angle of greater than 2° and more preferably greater than 4°. An angle of 5° has proven to be particularly expedient.

The seal may be an O-ring seal.

Further details of the invention will emerge from the following detailed description and from the appended drawings, which illustrate preferred embodiments of the invention by way of example.

DETAILED DESCRIPTION

Figure 1:
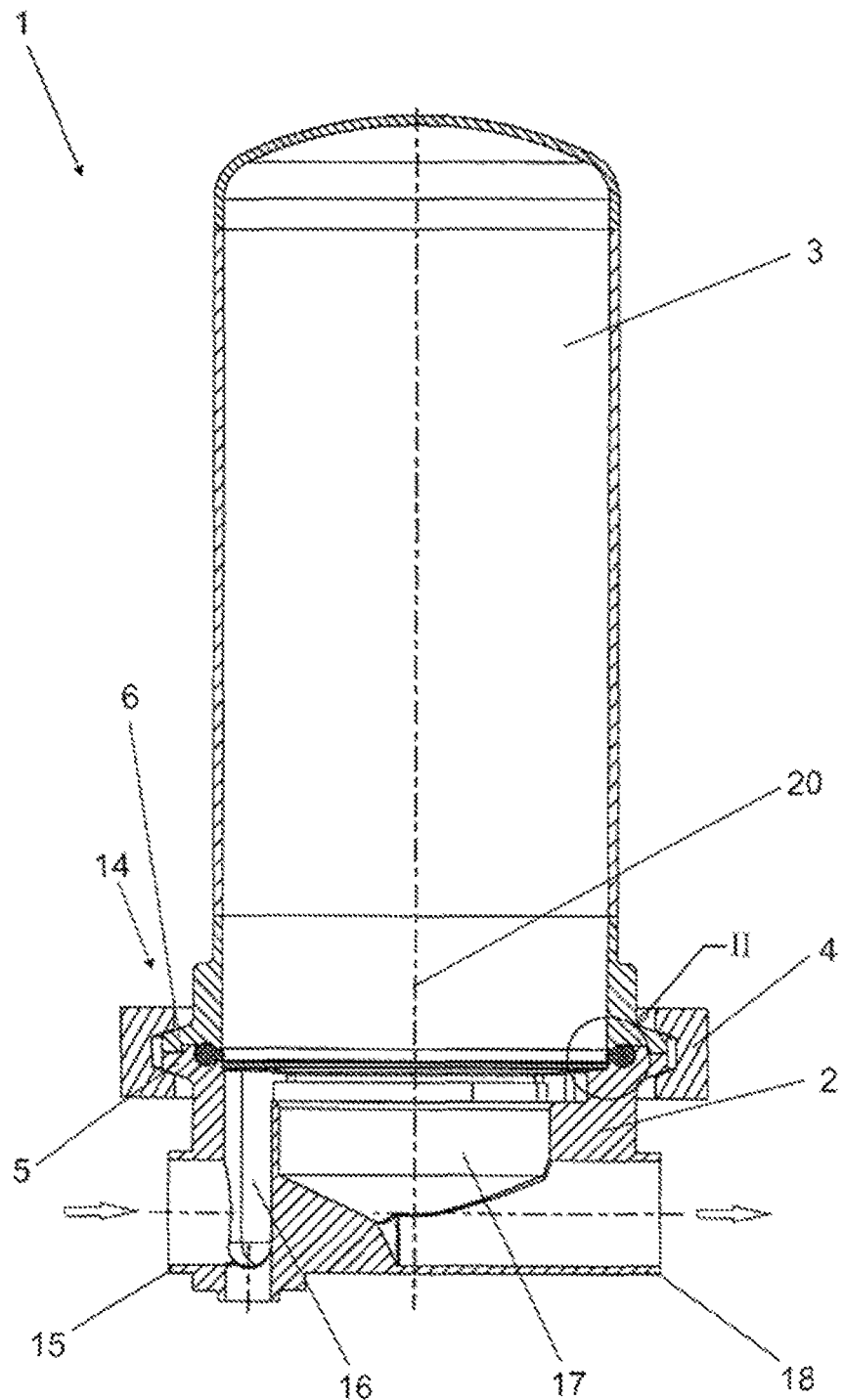
FIG. 1 is a sectional side view of a filter housing.
Figure 2:
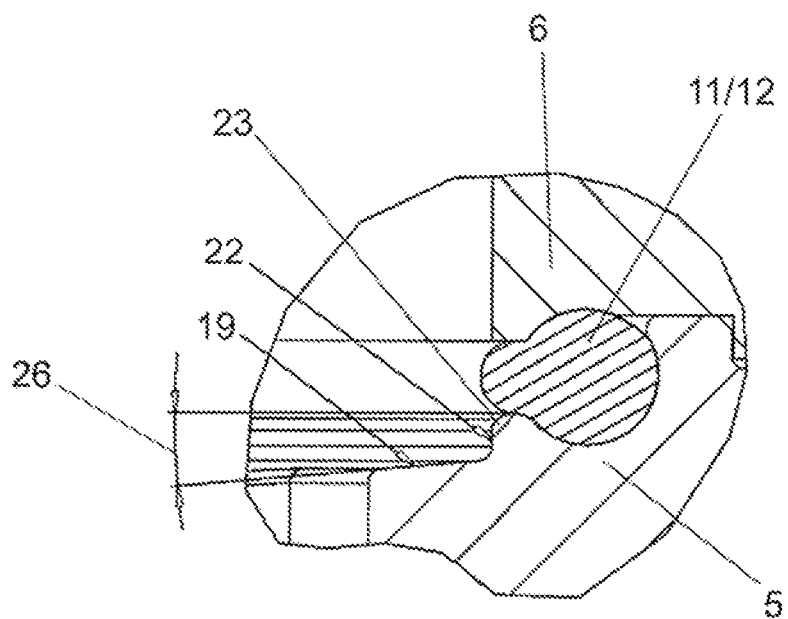
FIG. 2 is an enlarged illustration of the detail II from FIG. 1.
Figure 3:
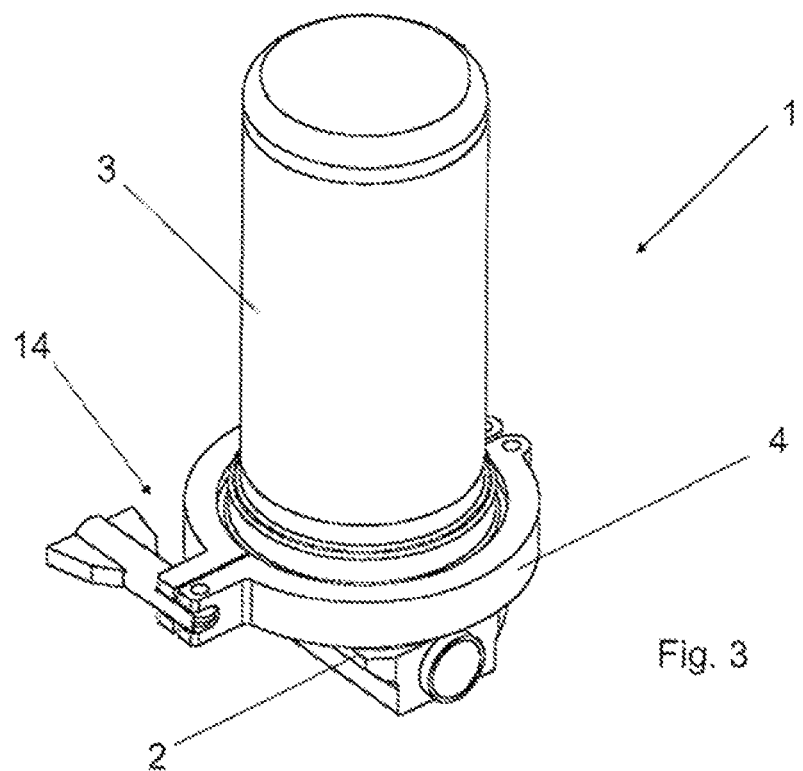
FIG. 3 is a perspective view of a filter housing, illustrated on a smaller scale.
Figure 4:
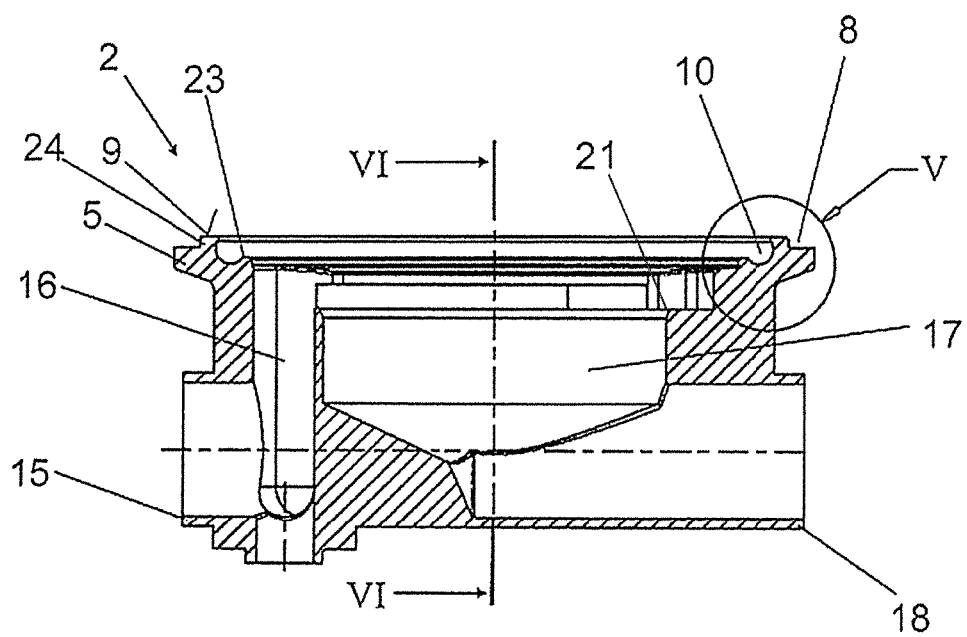
FIG. 4 is a sectional side view of the housing base of FIG. 1.
Figure 5:
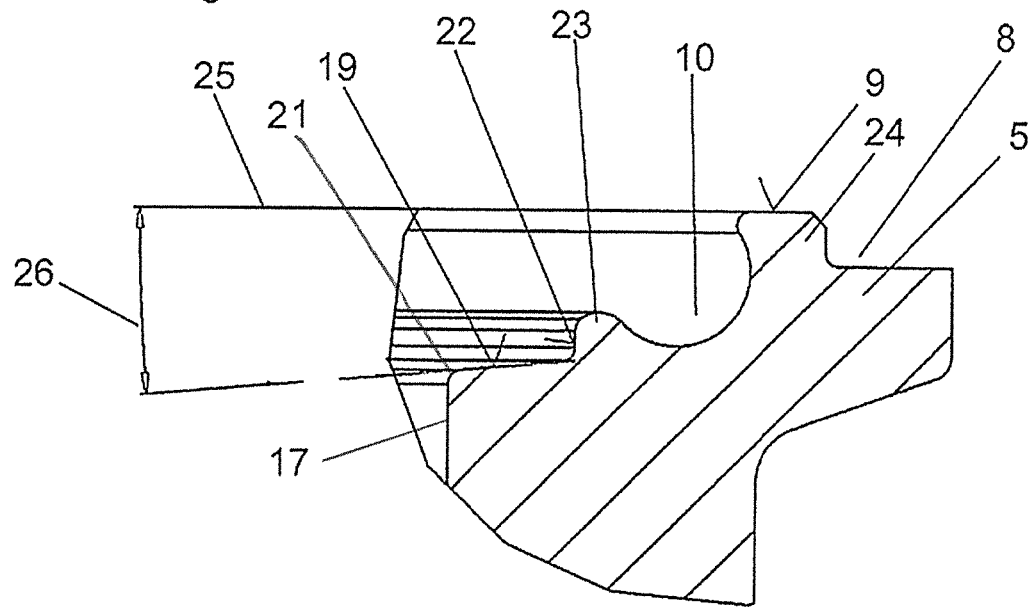
FIG. 5 is an enlarged illustration of the detail V of FIG. 4.
Figure 6:
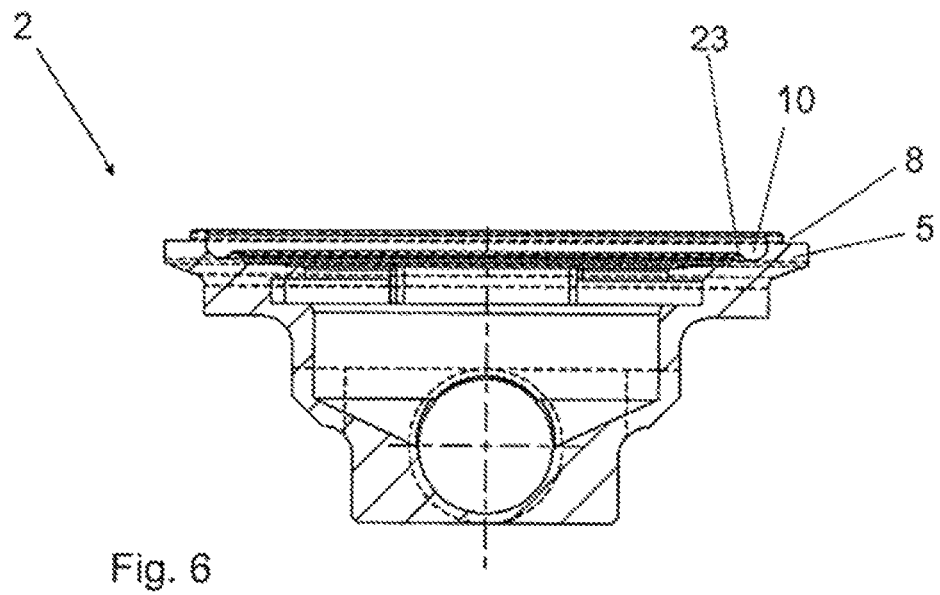
FIG. 6 is a cross-sectional view of the housing base taken along the line VI-VI in FIG. 4
Figure 7:
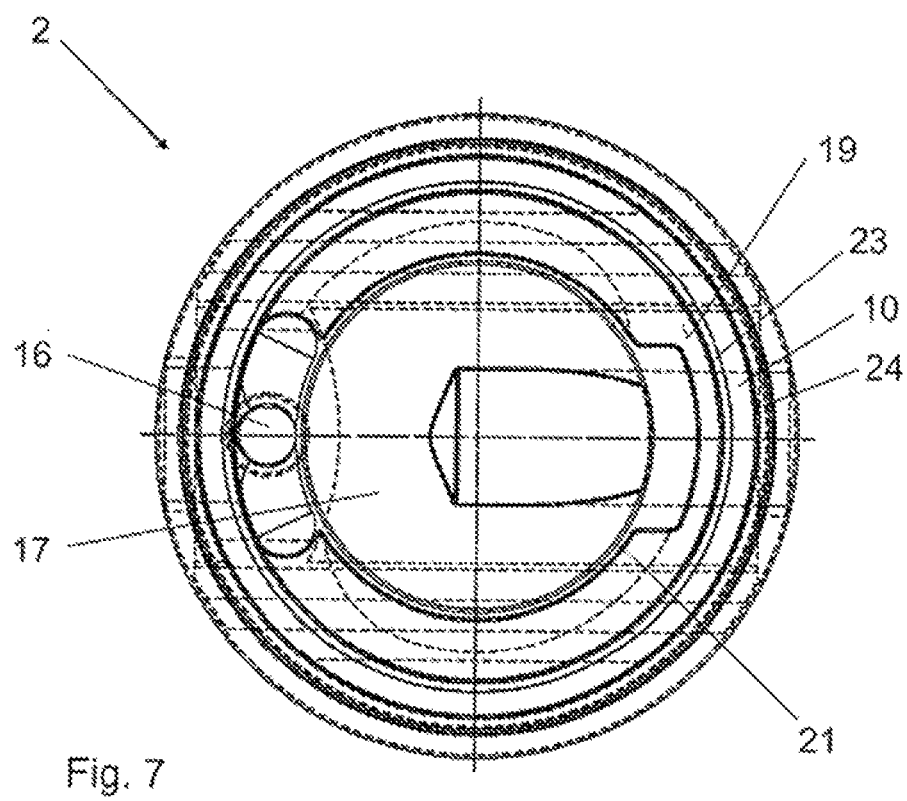
FIG. 7 is a plan view of the housing base of FIG. 4.
Figure 8:
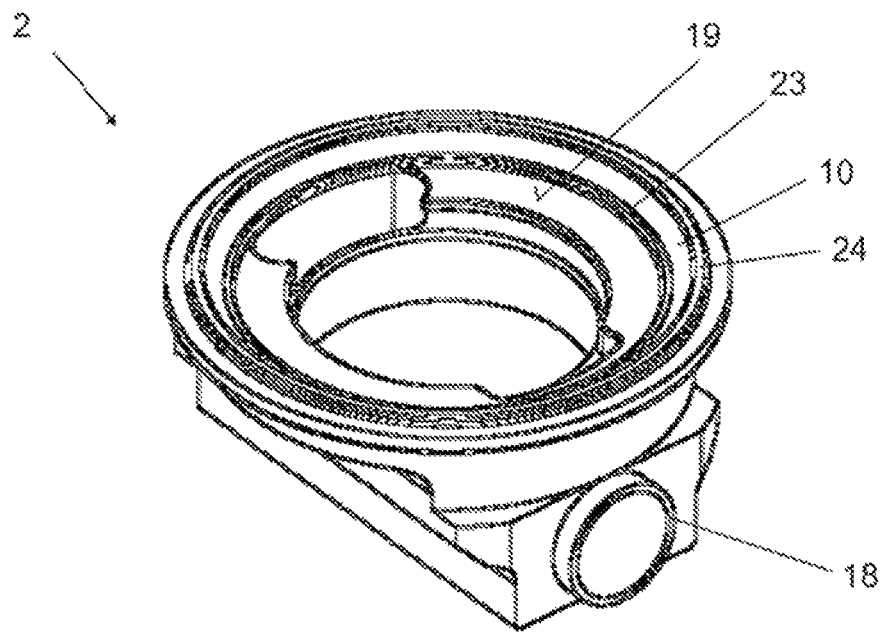
FIG. 8 is a perspective view of the housing base of FIG. 4.
Figure 9:
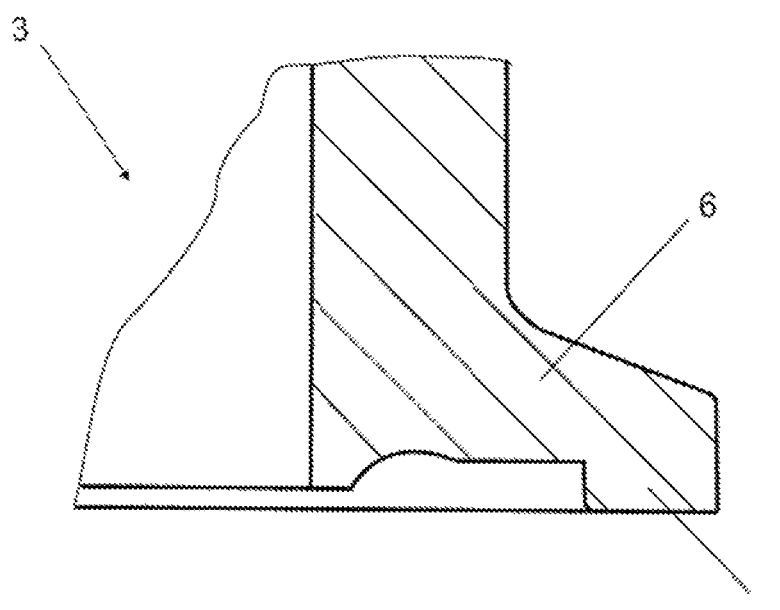
FIG. 9 is an enlarged sectional illustration of a detail of the housing dome of FIG. 1.

A filter housing 1 is composed substantially of a housing base 2, a housing dome 3, a clamp 4 and a seal 11.

The housing base 2 has, in the direction of the housing dome 3, a groove-type clamping fitting 5. The housing dome 3 has, in the direction of the housing base 2, a flange-type clamping fitting 6 with an encircling flange 7 that. engages into an encircling groove 8 of the groove-type clamping fitting 5. The groove 8 is opened radially to the outside. The groove-type clamping fitting 5 has, on its face surface 9, a receiving groove/seal groove 10 for a seal 11, which in the exemplary embodiment is in the form of an O-ring seal 12.

The groove-type clamping fitting 5 and the flange-type clamping fitting 6 can be sealed against one another by means of the seal 11 and are, in a manner known per se, pressed and fixed against one another by a clamp 13. In this way, the housing base 2 and the housing dome 3 are connected by means of an aseptic clamping connection 14, such as is known from DIN 11864-3 or as a hygiene connection from DIN 11853-3.

The housing base 2 has a lateral port 15 for the supply of fluid, that is to say for the supply of liquid to be filtered. The port 15 transitions into an inflow duct 16 running in a vertical direction, and conducts the liquid to be filtered to a filter (not illustrated).

The housing base 2 has a central outflow duct 17 that runs in the vertical direction and that transitions into a horizontal port 18 for the discharge of fluid. In the direction of the housing dome 3, the housing base 2 has an annular base surface 19. In the direction of the housing longitudinal axis 20, the base surface 19 is delimited by its central encircling outflow opening 21. In the direction of the receiving groove 10 of the seal 11, the base surface 19 is delimited by an encircling inner surface 22 of an inner collar 23. The receiving groove 10 for the O-ring seal 12 is arranged between the inner collar 23 and an outer collar 24 that is spaced apart from the inner collar 23 to the outside.

The base surface 19 is inclined by an angle 26 of 5° with respect to a horizontal plane 25 running transversely with respect to the housing longitudinal axis 20, that is to say said base surface slopes downward toward the housing longitudinal axis 20.

The embodiments discussed in the specific description and shown in the figures self-evidently constitute merely illustrative exemplary embodiments of the present invention. A broad spectrum of possible variants will emerge to a person skilled in the art in the light of this disclosure.

LIST OF REFERENCE NUMERALS

1 Filter housing
2 Housing base
3 Housing dome
4 Clamp
5 Groove-type clamping fitting
6 Flange-type clamping fitting
7 Flange of 6
8 Groove of 5
9 Face surface of 5
10 Receiving groove/seal groove
11 Seal
12 O-ring seal of 11
13 Clamp
14 Aseptic clamping connection
15 Port of 2
16 Inflow duct
17 Outflow duct
18 (Horizontal) closure
19 Base surface
20 Housing longitudinal axis
21 Outflow opening of 19
22 Encircling inner surface
23 Inner collar of 2
24 Outer collar of 2
25 Horizontal plane
26 Angle

The invention claimed is:

1. A filter housing (1) for exchangeable filters, having a housing base (2) for accommodating the filter and having a housing dome (3) that engages over the filter, the housing base (2) or and the housing dome (3) being connectable to one another by an aseptic clamping connection (14) that has a groove-type clamping fitting (5) on the housing base and has a flange-type clamping fitting (6) on the housing dome, the groove-type clamping fitting (5) and the flange-type clamping fitting (6) being fixed against one another in their connected position by a clamp (4), the groove-type clamping fitting (5) having inner and outer collars (23, 24) defining a seal groove (10), a seal (11) that seals the groove-type clamping fitting (5) off with respect to the flange-type clamping fitting (6) being disposed in the seal groove (10) between the inner and outer collars (23, 24), the housing base (2) having an inlet port (15) for supplying liquid to be filtered and an outlet port (18) for discharging filtered liquid, the housing base (2) further having a base surface (19) radially inward of the inner collar (23) and offset axially from the seal groove (10) and extending toward the outlet port (18), all areas of the base surface (19) between the inner collar (23) and the outlet port (18) being inclined inward toward a longitudinal axis (20) of the housing (1) with respect to a horizontal plane (25) arranged transverse to the longitudinal axis (20) of the housing (1) so that the inclined base surface (19) guides any of the liquid thereon to the outlet port (18).

2. The filter housing of claim 1, wherein the base surface (19) is of annular form with a central opening (21) leading to a liquid outflow (17) and with the liquid outflow (17) leading to the outlet port (18).

3. The filter housing of claim 2, wherein the seal groove (10) is delimited in the direction of the longitudinal axis (20) of the housing (1) by an inner collar (23) with an encircling inner surface (22) that forms an outer delimitation (24) for the base surface (19).

4. A filter housing for exchangeable filters, having a housing base (2) for accommodating the filter and having a housing dome (3) that engages over the filter, the housing base (2) or and the housing dome (3) being connectable to one another by an aseptic clamping connection (14) that has a groove-type clamping fitting (5) on the housing base and has a flange-type clamping fitting (6) on the housing dome, the groove-type clamping fitting (5) and the flange-type clamping fitting (6) being fixed against one another in their connected position by a clamp (4), the groove-type clamping fitting (5) having a seal groove (10) with a seal (11) that seals the groove-type clamping fitting (5) off with respect to the flange-type clamping fitting (6), the housing base (2) having an inlet port (15) for supplying liquid to be filtered and an outlet port (18) for discharging filtered liquid, the housing base (2) having a base surface (19) radially inward of the seal groove (10) and offset axially from the seal groove (10) and extending toward the outlet port (18), the base surface (19) being inclined inward toward a longitudinal axis (20) of the housing (1) with respect to a horizontal plane (25) arranged transverse to the longitudinal axis (20) of the housing (1) so that the inclined base surface (19) guides any of the liquid thereon to the outlet port (18), wherein the seal groove (10) is delimited in the direction of the longitudinal axis (20) of the housing (1) by an inner collar (23) with an encircling inner surface (22) that forms an outer delimitation (24) for the base surface (19).

5. The filter housing of claim 4, wherein the encircling inner surface (22) runs parallel to the longitudinal axis (20) of the housing (1).

6. The filter housing of claim 4, wherein the base surface (19) is inclined toward the longitudinal axis (20) of the housing (1) with respect to the plane (25) arranged transverse to the longitudinal axis (20) of the housing (1) by an angle (26) of greater than 2°.

7. The filter housing of claim 5, wherein the base surface (19) is inclined toward the longitudinal axis (20) of the housing (1) with respect to the plane (25) arranged transverse to the longitudinal axis (20) of the housing (1) by an angle (26) of greater than 4°.

8. The filter housing of claim 6, wherein the base surface (19) is inclined toward the longitudinal axis (20) of the housing (1) with respect to the plane (25) arranged transverse to the longitudinal axis (20) of the housing (1) by an angle (26) of 5°.

9. The filter housing of claim 4, wherein the seal (11) is an O-ring seal (12).

10. The filter housing of claim 4, wherein the inlet port (15) and the outlet port (18) are substantially perpendicular to the longitudinal axis (20) of the housing (1).

11. The filter housing of claim 4, wherein the liquid outflow (17) is substantially concentric with the longitudinal axis (20) of the housing (1).

* * * * *